Oct. 22, 1968     H. D. HORTON     3,406,599

APPARATUS FOR CUTTING AND GROOVING CEMENT LINED PIPE

Filed Nov. 24, 1967

*INVENTOR.*
HERBERT D. HORTON
BY
MARCUS L. BATES

United States Patent Office 3,406,599
Patented Oct. 22, 1968

3,406,599
APPARATUS FOR CUTTING AND GROOVING CEMENT LINED PIPE
Herbert D. Horton, 3011 Lakeview Drive, Odessa, Tex. 79760
Filed Nov. 24, 1967, Ser. No. 685,518
7 Claims. (Cl. 82—101)

ABSTRACT OF THE DISCLOSURE

Apparatus for cutting and grooving pipe, and especially cement lined pipe, comprising a floating platform which rotatably supports the pipe and which is adapted to move about in order to conform to irregularities produced by a bent pipe during its rotational movement. The floating platform rotatably supports the pipe while at the same time forces the pipe toward a stop means. Means are provided for cutting a butt joint at one end of the pipe. Means for cutting a circumferentially extending groove are located a spaced apart distance from the butt end cutting means. Stop means cooperate with the butt of the pipe to maintain alignment of the groove with the groove cutting means during the cutting operation.

The floating platform includes a centrally located mount means which centrally ties the platform to a supporting member. Resilient means are radially spaced about the stop means and are attached to the platform.

Background of the invention

Various gases and liquids are transported by means of underground pipe lines. These pipe lines are often cement lined, that is, the interior is coated with a uniform application or thickness of concrete. Cement lined pipes are expensive and therefore when a pipe line is abandoned, it is advantageous to salvage the pipe by cutting it into suitable lengths for transportation in order to reuse the pipe in another transmission line.

In building a transmission pipe line, joints of pipe are welded together in series relationship to provide an unlimited length of pipe. The joints are limited in length to about thirty or forty feet since the pipe usually must be transported from the pipe manufacturer to the job site. Where the pipe must be cement lined, it must also be sent to the fabricator who applies the cement, usually by a spinning process. The terminal ends of the pipe are generally beveled in order to enable a more satisfactory electric welding of the butt joints. In welding cement lined pipe, the cement adjacent the welded butt ends obviously must be spaced apart, thereby leaving a gap. Often the cement at this gap is over-heated or otherwise injured by the energy dissipated by the welding process during the time required for the welded joint to be properly mated. This causes the unprotected steel at the welded joint to undergo rapid deterioration. Therefore, there is a trend toward the growing acceptance in the pipe line industry to adapt a clamp which has been developed for the purpose of mating the pipe joints in a manner which overcomes the above disadvantages. One example of this clamp is the Victaulic coupling which includes a suitable seal which precludes communication of the fluid within the pipe line with respect to the metallic wall of the pipe welds. The use of this clamp entails a groove being placed about each butt end of the pipe a spaced apart distance from the terminal ends thereof. The metallic ends of the pipe, as well as the cement liner, must be flush in order to be properly joined together.

In salvaging old pipe, it is common practice to cut the pipe into the maximum lengths or joints possible in order to legally transport the pipe to its next point of usage. This operation leaves a ragged terminal end while at the same time a substantial amount of the cement liner is destroyed. Before using the salvaged pipe, the pipe is placed in a hollow spindle lathe where the steel pipe is again properly beveled to thereby present a suitable welding surface to enable proper installation. This action usually leaves the cement liner in very poor condition. Furthermore, should it be desired to use the salvaged pipe in a manner whereby it is connected together using the above described coupling, the cement liner usually has an unsatisfactory terminal end at the butt joint. Also, the circumferentially extending groove which enables installation of the coupling must be formed about each terminal end of the pipe as pointed out above.

Summary

It is therefore desirable to be able to provide the terminal ends of various pipes with a groove which enables the pipe to be connected together in series relationship by using mechanical couplings rather than electrically welded attachments. It is further desirable to be able to cut a suitable butt joint at the terminal end of reclaimed pipe while at the same time providing a groove at a spaced apart distance from the terminal end of the pipe to thereby enable the use of the above described coupling.

More importantly, it is desirable to be able to cut salvaged cement lined pipe into suitable lengths which leaves the terminal ends of the pipe in satisfactory condition with respect to the steel pipe and the cement liner thereof, while at the same time being able to provide such a cement lined pipe with a groove suitable for use with a mechanical coupling.

These desires, and the below named objects are attained by the provision of an apparatus having an abrasive cut off wheel associated with a milling device and a pipe holding device whereby the pipe may be rotatably supported while the abrasive cut off wheel and the groove milling device provides each terminal end of the pipe with a suitable butt joint end and a suitable groove with the groove being milled at a spaced apart distance from the joint. The apparatus includes a floating platform centrally attached to a support means and includes radially disposed resilient means spaced apart from the central support member. The rotatable means support the pipe while at the same time forces the pipe against a stop means. The stop means includes alignment means associated with the groove which is subsequently formed in the surface of the pipe.

It is therefore a primary object of this invention to provide a pipe with a satisfactory butt end and groove at the terminal ends thereof.

Another object of the present invention is the provision of a means by which used pipe can be cut into satisfactory lengths and provided with a smooth butt end as well as a groove spaced apart therefrom.

Another object of the present invention is the provision of a pipe cutting machine which is mounted upon the floating platform which moves in a manner to conform to the movement imparted thereto by a bent piece of pipe.

It is also an object of the present invention to be able to field cut varying lengths of pipe so as to eliminate undesired portions thereof while at the same time providing the salvaged pipe with suitable terminal ends.

The above objects are attained in accordance with the present invention by the provision of an apparatus fabricated essentially in accordance with the above objects.

Description of the preferred embodiments

Figure 1:
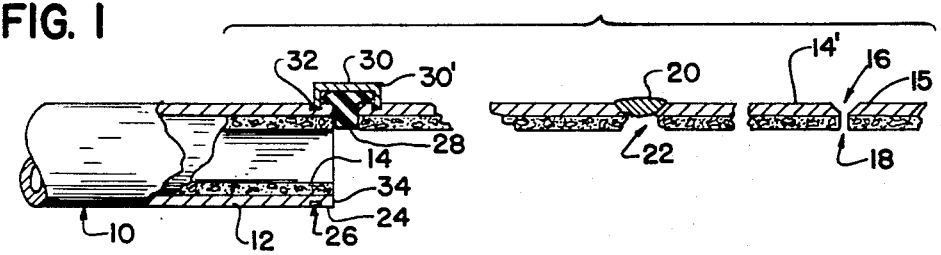
FIGURE 1 is a partly cross-sectional partly elevational view of several pieces of pipe which are fabricated and connected together in accordance with the prior art.
Figure 2:
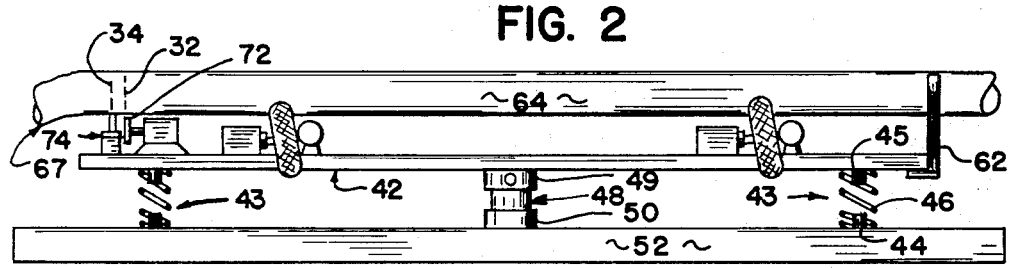
FIGURE 2 is an elevational view of an apparatus made in accordance with the teachings of the present invention.
Figure 3:
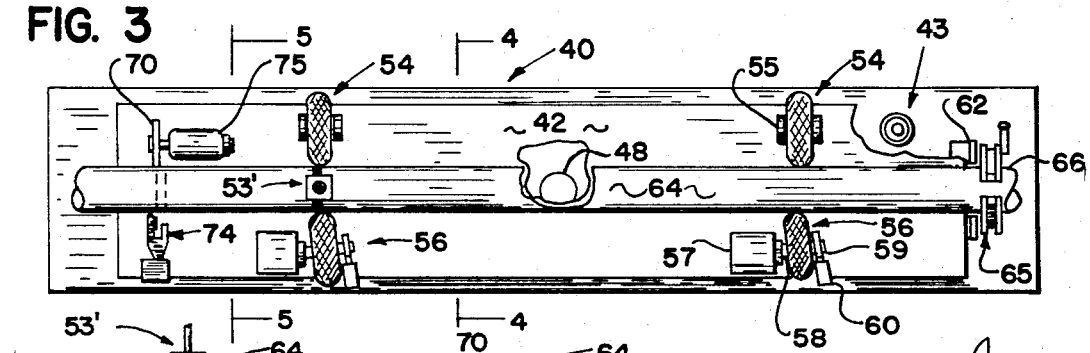
FIGURE 3 is a top plan view of the device seen in FIGURE 2.

Looking to the details of the drawings, and in particular to FIGURE 1, wherein there is seen illustrated generally by the arrow at numeral 10 a pipe, which may be a part of a fluid transmission line, and which may considerably vary in size, for the reason that the actual physical size of the pipe associated with the instant invention is deemed to be of no import. The pipe includes a conventional steel wall 12 and is provided with a cement liner 14. The concrete forming the liner is generally added to the inside peripheral wall surface of the pipe as a subsequent operation. As seen at numeral 15, the steel pipe is sometime provided with a slope at 16, with the liner of each pipe abutting in face to face relationship as indicated at 18, whereupon the pipe may be welded in the usual manner as seen at 20. The welding action often destroys a portion of the concrete liner as seen at 22. Therefore, in order to eliminate communication of the transported fluid with the metal interior of the pipe at 22 man has devised an ingenious coupling whereupon the terminal ends 24 of a pipe is provided with a groove 26 circumferentially encompassing the pipe to thereby enable a gasket 28 to be interposed between the butt ends of the pipe at 34. A clamp 30 having depending legs 30′ cooperating with the groove 32 cooperates with each terminal end to thereby rigidly maintain the pipes abutted to each other in fluid tight relationship. The success of the mechanical coupling 30 over the old welded coupling is evidenced by its popularity in the industry.

Cement lined pipe 10 is expensive. When a pipe line is abandoned, it is economically desirable to dig up the line and transport it to a new location. In salvaging pipe, it is necessary to cut the line into lengths varying between thirty and forty feet to enable transportation thereof. This action leaves the butt ends of the pipe unsuitable for welding, therefore a new beveled end, such as seen at 16, must be provided. This entails placing the heavy pipe within a hollow spindle in order to perform the beveling operation. The pipe usually is warped and often damaged and therefore is cumbersome to handle in any type machine lathe. Furthermore, although a suitable bevel 16 may be attained, the cement liner is usually left in unsatisfactory condition. Should it be desirable to use a coupling 30, then a groove 26 must be cut in the wall of the pipe during the lathing operation.

Looking now to the details of FIGURES 2 through 6, there is seen a pipe cut-off and grooving apparatus 40 having a floating platform 42 which is upwardly biased at each corner thereof by a spring assembly 43. The spring assembly includes spring retainers 44 and 45 which suitably maintains a spring 46 compressed therebetween. Centrally located of the floating platform is a ball joint assembly 48 which includes an upper socket 49 which receives a lower support 50 which in turn interconnects the support means 52. The support 52 may be a skid or a truck bed. While the ball is preferably located on the upper end of member 48 and located within the socket 49, the relationship may be reversed if desired.

Spaced apart rollers 53′ are attached to a hydraulic cylinder (not shown) and to the platform in order to maintain the pipe closely adjacent to the support wheels. This prevents eccentric movement of the pipe as the grooving and cutting operation is being carried out. It should be understood that the pair of wheels and spaced apart rollers nearest adjacent the abrasive cut off and grooving machine may be located in closer proximity to the alignment and stop means 74 if desired.

Spaced apart fixed rotatable tires 54 are longitudinally arranged along the platform and are journaled at 55 by any convenient means to the platform. Opposite adjacent spaced apart wheels 56 are inclined with respect to the horizontal and are rotationally moved by means of motor 57 which drives the tire by means of universal 58. The tire is journaled at 59 and connected to the hydraulically actuated cylinder 60 which moves the tires 56 toward the oppositely located tires 54.

A pipe receiving yoke 62 is disposed at the right extremity of the apparatus and receives pipe 64 therein. A pipe aligning cage 65 may be attached to the undamaged portion 66 of the pipe to thereby prevent the pipe from moving toward the damaged end 67.

An abrasive cut-off wheel 70 is aligned with respect to the pipe to enable the wheel to cut through both the steel pipe and the cement liner associated therewith along a predetermined line 34 in accordance with the position of the pipe 64 with respect to platform 42. Milling wheel 72 is aligned a spaced apart distance from the cut-off point 34 so as to provide a groove 26 as indicated at 32, with the groove being spaced a suitable and predetermined distance from the butt end 34 in accordance with the design requirements of the clamp 30. Alignment and stop means 74 are suitably provided in aligned relationship with respect to the position 32, 34 of the groove and cut-off point respectively.

Figures 4, 5, 6:
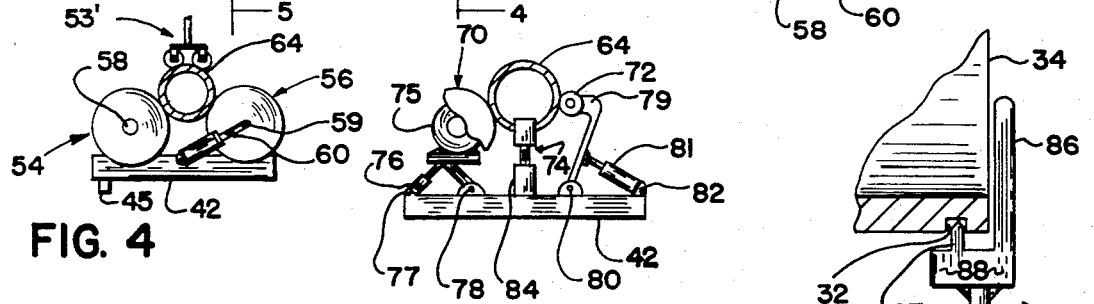
FIGURE 4 is a cross-sectional view taken along line 4—4 of FIGURE 3 with some additional parts being included in order to better illustrate the device.
FIGURE 5 is a cross-sectional view taken along line 5—5 of FIGURE 3 with some additional parts being shown for clarity, and some parts being broken away in order to illustrate what lies therebehind.
FIGURE 6 is a fragmentary partly cross-sectional view of part of the device seen in the foregoing figures.

Motor 75 is suitably geared to the abrasive cut-off wheel and journaled to the platform where it may be moved by means of hydraulic cylinder 76. The cylinder and motor are journaled to the platform as seen at 77 and 78. Motor 79 is suitably geared to the mill and is pivoted at journal 80 and provided with a hydraulic cylinder 81 journaled at 82. Seen depending from housing 85 is a shaft attached to bridge 88, which in turn includes depending spaced apart portions 86, 87 which are adapted to be extended into the configuration of FIGURE 6, or retracted clear of the pipe. As seen in FIGURE 6, the member 86 contacts the terminal end of the pipe to thereby provide a stop means, while member 87 cooperates with the groove as it is formed in the outer peripheral surface of the pipe, and as the groove is being milled, member 87 rides therein to thereby form a guide or groove engaging member. This cooperative relationship maintains the pipe properly aligned with the remaining structure.

Operation

In operation, where it is desired to prepare a circumferential groove 26 about a marginal depending edge portion of a cement lined pipe 14′ or 15, so as to enable incorporation of the seal and clamp arrangement 30 thereon, the pipe is mounted upon the platform 42 with the pipe rotatably supported by wheels 54, 56 while the terminal end 34 abuts member 86 of the stop means. With wheels 56 driving the pipe in a rotational manner, the pipe is forced toward the stop means 74 while the milling attachment 72 is brought to bear against the outside peripheral surface of the pipe. This enables the rotating milling attachment to mill or cut a groove 32 into the pipe while the guide 87 maintains the terminal end of the pipe properly aligned with the stop and with the mill.

Where the terminal end of the pipe is damaged, as seen at 67, the stop means 74 is best retracted away from the surface of the pipe and a cage 65 placed about the undamaged portion 66 of the pipe in order to permit the cage to bear against the yoke 62 whereupon rotational movement of tires 56 forces the pipe 64 toward the damaged end 67. A cage as seen at 65 is well known in the art. The abrasive cut-off 70 is brought against the outer periphery of the pipe whereupon the damaged end 67 is cut off inasmuch as the abrasive wheel can cut both concrete and steel. Hence, a flush or butt end 34 is attained for both the concrete liner and the metal pipe. This enables adjacent butt ends of the pipe to readily receive a gasket 28 in sealing relationship therewith, as seen at 28–32. The groove 26, of course, must be placed about the terminal end of the pipe in the above described manner.

Figure 7:
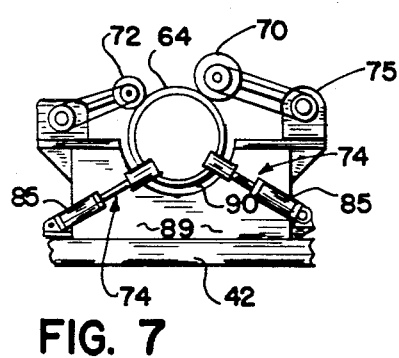
FIGURE 7 is a modification of part of the device seen in the foregoing figures.

The embodiment of FIGURE 7 illustrates a multiplicity of alignment and stop means 74 associated with the platform 42. A second yoke 89 provides a convenient mount means for the illustrated abrasive cut-off and milling machine. When deemed desirable, the spaced apart rollers 53' and the wheels associated therewith may be moved closely adjacent to the vertical plate member forming yoke 89.

It will therefore be seen that the present invention provides a floating platform 42 which receives a pipe 64 thereon in a manner whereby irregularities or misalignment of the pipe permits the entire platform to move about the single central axis provided by the ball joint 48 whereupon the rotating pipe may be satisfactorily cut and grooved by the mill and cut-off which is attached to the platform and moves therewith.

The foregoing is considered as illustrative only of the principles of the invention. Further, since numerous modifications and changes will readily occur to those skilled in the art, it is not desired to limit the invention to the exact construction and operation shown and described, and accordingly all suitable modifications and equivalents may be resorted to, as fall within the scope of the invention as claimed.

I claim:
1. An improved mechanism for cutting and grooving pipe including a floating platform, a supporting member, journaled means maintaining said platform attached to said support member, pipe support means attached to said platform, means for rotating the pipe, stop means maintaining the pipe positioned with respect to said floating platform;
  cutting means and grooving means positioned with respect to the pipe whereby the pipe may be cut to form a butt end while a groove may be formed a spaced apart distance from the butt end.
2. The improvement of claim 1 wherein said means maintaining the pipe positioned with respect to said floating platform includes spaced apart members depending from a common member;
  one spaced apart member adapted to engage the groove cut into the pipe, the remaining member adapted to slidably engage the butt end of the pipe to thereby limit movement of the pipe towards the remaining member.
3. The improvement of claim 1 wherein the means for rotating the pipe is provided by a support wheel placed adjacent the outer peripheral surface of the pipe, means for rotating said wheel, said wheel being inclined with respect to the normal axis of the pipe to thereby force the pipe against the stop while imparting rotational movement thereto.
4. The improvement of claim 1 wherein said floating platform is centrally journaled to said supporting member, and resilient means biasing said platform into the horizontal position.
5. The improvement of claim 4 wherein said journaled means includes a ball and socket so as to bottom support said platform; said resilient means includes multiple springs radially spaced from said ball and socket and located between the platform and support member.
6. The improvement of claim 1 wherein a yoke is rigidly attached to the platform, pipe cage means adapted to be fastened to the pipe and to bear against said yoke to thereby limit longitudinal movement of the pipe.
7. The improvement of claim 1 wherein said means maintaining the pipe positioned with respect to said platform includes spaced apart rollers adapted to urge the pipe downwardly against said pipe support means, and further including a movable common member having spaced apart members thereon; one said spaced apart member adapted to engage the groove; the remaining spaced apart member adapted to slidably engage the butt end of the pipe to thereby limit longitudinal motion of the pipe with respect to the platform.

References Cited
UNITED STATES PATENTS

| 2,459,068 | 1/1949 | Eastwood | 82—101 XR |
| 2,903,934 | 9/1959 | Montgolf et al. | 82—101 XR |
| 3,107,564 | 10/1963 | Coker et al. | 82—101 |
| 3,173,318 | 3/1965 | Lindemann | 82—101 XR |
| 3,292,468 | 12/1966 | Orthey | 82—101 |

HARRISON L. HINSON, *Primary Examiner.*